United States Patent [19]

Hendrix et al.

[11] 4,267,783

[45] May 19, 1981

[54] SEED BED PREPARATION METHOD AND APPARATUS

[76] Inventors: Robert W. Hendrix; Jerry W. Hendrix, both of Rte. 2, Statesboro, Ga. 30458

[21] Appl. No.: 18,165

[22] Filed: Mar. 7, 1979

[51] Int. Cl.³ .................... A01C 5/06; A01B 13/02
[52] U.S. Cl. .................... 111/52; 111/85; 172/149; 172/177; 172/184; 172/196; 172/200
[58] Field of Search .............. 111/1, 6, 7, 85, 86, 111/52, 59, 62; 172/552, 553, 121, 514, 120, 177, 184, 540, 149, 196, 200

[56] References Cited

U.S. PATENT DOCUMENTS

| | | | |
|---|---|---|---|
| 183,947 | 10/1876 | Lewis | 111/86 X |
| 404,108 | 5/1889 | Patric et al. | 111/85 |
| 874,867 | 12/1907 | Richelderfer | 172/552 X |
| 1,349,875 | 8/1920 | Currier | 172/553 X |
| 2,553,356 | 5/1951 | Cady | 172/514 |
| 2,669,173 | 2/1954 | Severance | 172/121 |
| 3,398,707 | 8/1968 | McClenny | 111/85 |
| 3,437,061 | 4/1969 | Wells | 111/1 |
| 3,692,120 | 9/1972 | Cline | 172/177 |
| 4,048,929 | 9/1977 | Zumbahlen | 111/85 |
| 4,055,126 | 10/1977 | Brown et al. | 111/85 |

FOREIGN PATENT DOCUMENTS

| | | | |
|---|---|---|---|
| 1063415 | 8/1959 | Fed. Rep. of Germany | 172/184 |
| 58809 | 4/1954 | France | 172/552 |

*Primary Examiner*—James R. Feyrer
*Attorney, Agent, or Firm*—Jones, Thomas & Askew

[57] ABSTRACT

A farm implement is provided having a sub-soiler followed by a seed bed preparation tool and a planter. The seed bed preparation tool includes a rotary bladed portion for filling in the furrow left by the sub-soiler with soil turned up by the sub-soiler and for forming a depression along the crop row for planting. The seed bed preparation tool can also include a curved packer blade at the rear thereof for packing the soil in a central portion of the depression formed by the rotary portion of the tool.

2 Claims, 4 Drawing Figures

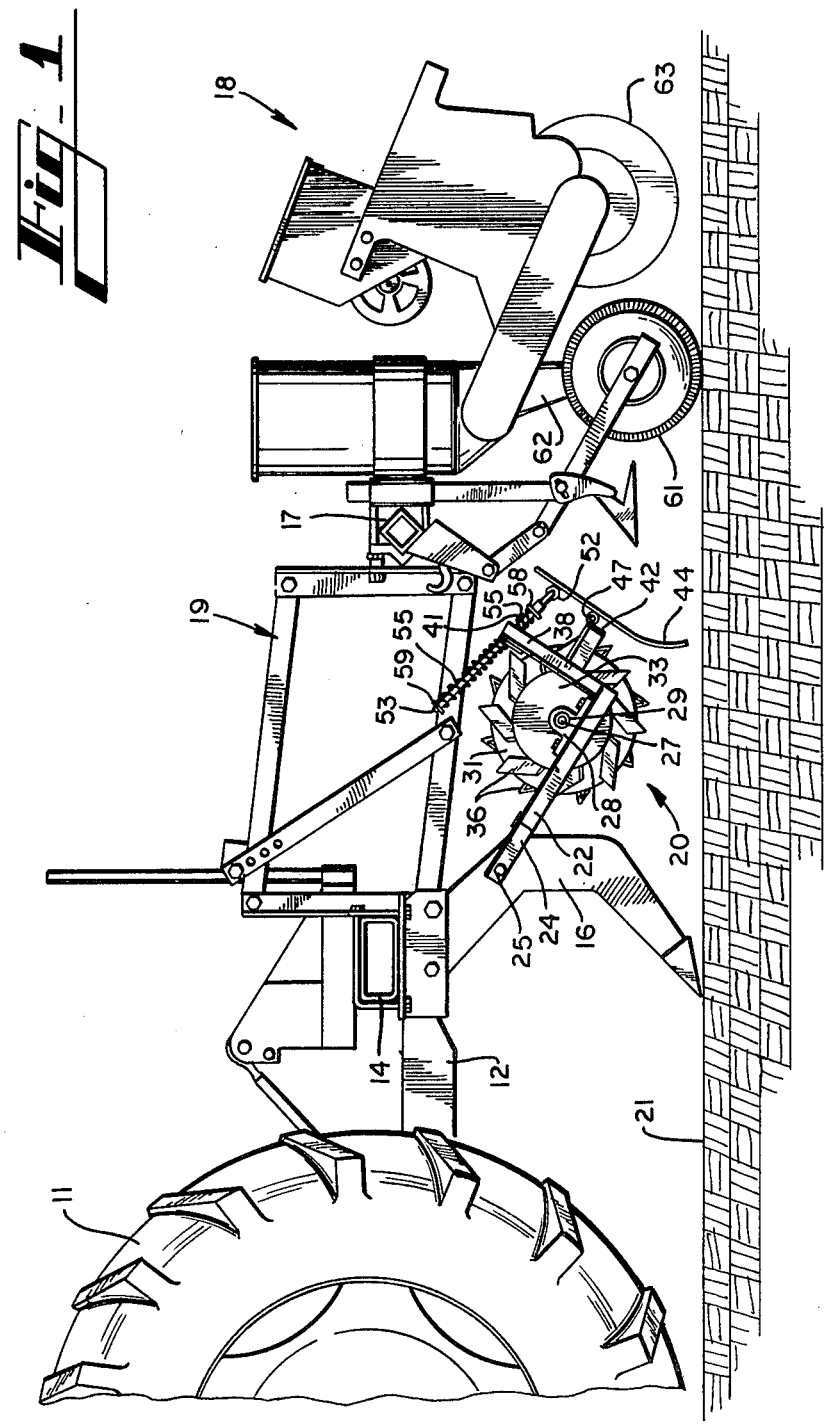

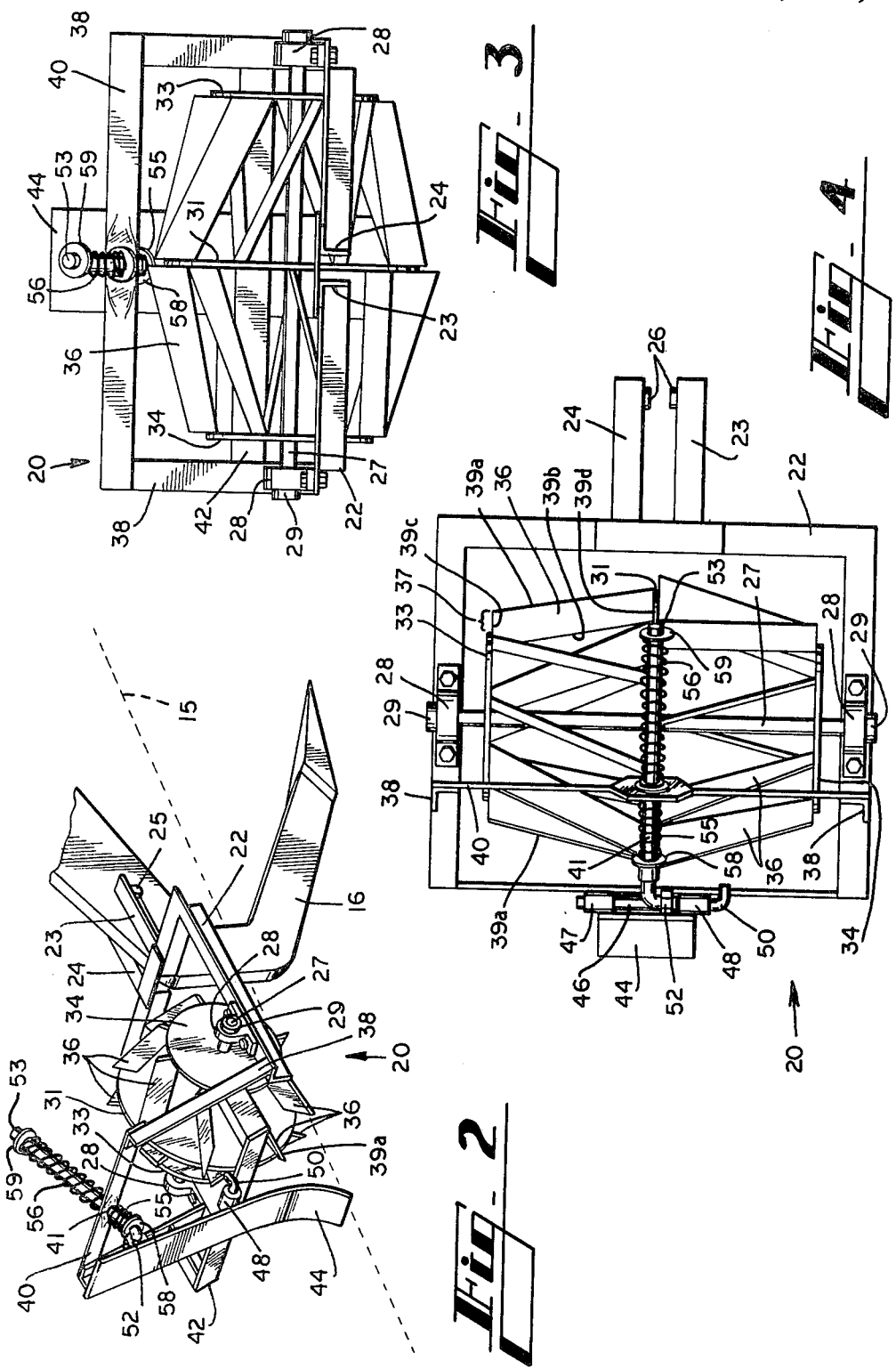

4,267,783

SEED BED PREPARATION METHOD AND APPARATUS

DESCRIPTION

Technical Field

The present invention relates to farm implements, and more particularly relates to implements used in the preparation of seed beds and to combination implements used for sub-soil plowing, seed bed preparation, and planting of seeds in rows.

BACKGROUND ART

In the growing of row crops, it is known that it is advantageous to loosen the compaction of the soil to a considerable depth prior to planting the seeds by running a sub-soiler along the centerline of each proposed crop row. Such deep cultivation allows deeper root growth of the plants, and leads to greater yields. In the interest of efficiency, such sub-soilers have been used as part of a combination implement, mounted to run immediately prior to a planter of the type generally known to those skilled in the art.

A problem that arises in using such a combination implement results from the fact that a sub-soiler leaves a deep groove or furrow that is not generally sufficiently filled in by the natural resettling of the soil behind the sub-soiler. Seeds dropped by the planter may fall too deeply into this furrow, especially if planting is followed closely by a rain, which may wash the seeds deeper into the furrow. If the seeds are planted too deeply, the young plants are not able to emerge. Attempts have been made in the prior art to include implements between the sub-soiler and the planter to prepare the seed bed. One common method has been to mount rotary spiders at the sides of the sub-soiler furrow to throw dirt from off the row into the furrow to fill it in. However, it has been found that the dry dirt thrown into the furrow provides a poor environment for the germination of the seed. Consequently, the desired density of plants along the row is difficult to control, a substantial amount of seed can be wasted, and gaps along the rows may lead to lower yields.

A means for leveling furrows left by a series of chisel plows is disclosed in U.S. Pat. No. 3,692,120. The device therein disclosed includes a rotary tool having fixed horizontal blades extending transverse to the row for pulverizing the soil, and a leveling blade following behind the rotary tool. Although operation of such an implement could result in filling in the furrows left by the chisel plows, it would leave a flat, level surface, whereas many farmers prefer to plant in a slight depression so that the depression can be filled with dirt to cover small weeds when the plants are at an early stage of growth.

Thus, there has been a need in the art for a seed bed preparation tool that could be run between a sub-soiler and a planter, and that would be capable of filling in the sub-soiler furrow with moist dirt turned up by the sub-soiler and also capable of preparing a suitable seed bed in a slight depression.

SUMMARY OF THE INVENTION

Briefly described, the present invention comprises a method and apparatus for forming a plurality of parallel furrows in the earth, partially filling in and shaping the furrows with the moist dirt from the furrows into parallel seed beds, and planting seeds at spaced intervals along each seed bed. The present invention solves the above problems in the prior art by providing, for each of the seed beds, an improved seed bed preparation implement for row crops, in combination with a sub-soiler and a planter. More specifically, the invention comprises a means for filling in the furrow left by a sub-soiler with moist dirt from along the centerline of the row, and a means for shaping a seed bed in the form of a depression.

The agricultural implement includes, for each crop row, a sub-soiler for cutting a deep groove to define a row, and a planter following the sub-soiler, the improvement comprising seed bed preparation means mounted between the sub-soiler and the planter, the seed bed preparation means comprising a means for filling in the groove formed by the sub-soiler with soil turned up by the sub-soiler and for forming a depression along the row, and a means for packing the soil in a central portion of the depression.

The means of the invention are provided by a rotary tool having soil-working blades which pulverize the soil and cut deeper into the soil at the middle of the rotary tool along the centerline of the row than at the outer portions of the tool. The soil-working blades are also slightly angled to move dirt from an area closely adjacent to the row toward the centerline of the row as the blades rotate through the soil, to fill in the deep furrow left by a sub-soiler. The shape of the rotary tool results in a seed bed in the form of a depression. The tool can also include a trailing blade for leveling and packing the soil in a central portion of the depression in order to further shape the depression and to prepare suitable seed bed conditions for the operation of a planter. It will be understood that such a seed bed preparation tool can be mounted on a common frame between a sub-soiler and a planter. In combination, such implements cooperate to produce a planted field with a better potential for seed germination and for a high yield.

Thus, it is an object of this invention to provide a method and apparatus for simultaneously forming a plurality of parallel furrows in the earth, partially filling and shaping the furrows with the moist dirt removed from the furrows to form a plurality of parallel seed beds with slight depressions extending along their lengths, and planting seeds at spaced intervals along the seed beds.

Another object of the present invention is to provide an improved seed bed preparation tool.

It is a further object of the present invention to provide an improved seed bed preparation tool in combination with a sub-soiler and a planter.

It is a further object of the present invention to provide a seed bed preparation tool capable of filling in a furrow left by a sub-soiler with moist soil turned up by the sub-soiler, and further capable of preparing a seed bed in the shape of a shallow depression.

It is a further object of the present invention to provide a seed bed preparation tool which pulverizes the soil and cuts through surface vegetation and roots.

These and other objects and advantages of the present invention will become apparent upon reference to the following description, the attached drawings and the appended claims.

BRIEF DESCRIPTION OF THE DRAWINGS

FIG. 1 is a side elevational view of a combination farm implement according to the present invention.

FIG. 2 is a pictorial view of a seed bed preparation tool according to the invention.

FIG. 3 is a front elevational view of a seed bed preparation tool according to the invention.

FIG. 4 is a top view of a seed bed preparation tool according to the invention.

DETAILED DESCRIPTION

Referring now in more detail to the drawing, in which like numerals represent like elements throughout the several views, FIG. 1 shows a side elevational view of a combination farm implement according to the present invention. A tractor 11, serving as a drawing means, includes a tractor hitch 12 to which is attached a tool bar 14. The combination implement is attached to the tool bar 14 in a manner well known to those skilled in the art. The combination implement includes a sub-soiler 16 which is mounted to run directly along the centerline of a row along which seeds are to be planted. The sub-soiler 16 penetrates into the ground 21 to loosen the compacted soil to a substantial depth, such as eighteen inches, so that the roots of the crops may grow deeply to allow the growth of larger and more productive crops. Attached directly to the upper portion or shank of the sub-soiler 16 is a seed bed preparation tool 20, to be described in detail hereinafter. A planter 18 of a type known to those skilled in the art is mounted to a planter tool bar 17, which is mounted parallel to but movable about the tool bar 14 by means of a parallel linkage 19. The parallel linkage 19 extends over the seed bed preparation tool 20 to locate the planter 18 behind the seed bed preparation tool 20 and directly along the row. The planter 18 can be of a well known type which includes a disc 61 to cut a V-shaped groove of the proper depth along the seed bed, a means 62 for dropping seed into the small groove, and a means 63 for closing and packing the groove over the seeds. The sub-soiler 16, the center of the seed bed preparation tool 20, and the groove-cutting disc of the planter 18 all travel along the centerline or drill line of the row, which is designated by a dashed line 15 in FIG. 2.

The combination implement is shown in FIG. 1 in an elevated position above the ground 21. Means associated with the tractor 11 for raising and lowering the tool bar 14 and implements attached thereto are well known to those skilled in the art. When lowered into an operating position, the elements of the combination implement assume positions with respect to the ground 21 wherein they perform the functions described herein. The working orientation of the seed bed preparation tool 20 is shown in FIG. 2.

The rotary seed bed preparation tool 20 of the present invention is shown in more detail in FIGS. 2-4. The rotary tool 20 comprises a U-shaped frame 22 including a pair of tongues 23 and 24 which extend from the frame 22 to straddle the shank of the sub-soiler 16, as shown in FIG. 2. A pivotal attachment 25, such as a nut and bolt, is made between the tongues 23 and 24 and the sub-soiler 16. In order to accommodate sub-soilers of varying thicknesses, spacer blocks 26 may be inserted between the tongues 23 and 24 and the sub-soiler 16, as shown in FIG. 4.

A generally horizontal axle 27 is mounted across the U-shaped frame 22 by means of bearings 29 contained in bearing housings 28 at each end of the axle 27. Fixedly attached to the axle are a central disc member 31, a left outer disc member 33 and a right outer disc member 34. The outer disc members 33 and 34 are mounted in parallel spaced relation to the central disc member 31 on either side thereof. The disc members 31, 33 and 34 are circular, but the diameters of the outer disc members 33 and 34 are smaller than the diameter of the central disc member 31.

Fixedly attached between the central disc member 31 and each of the outer disc members 33 and 34 are a plurality of soil-working blades 36. The blades 36 are equally spaced from one another, preferably with eight blades between the central disc member 31 and each outer disc member 33 and 34. The blades 36 are attached in circumferential array about the disc members 31, 33 and 34, with each blade 36 being rigidly attached at one of its ends to the periphery of the central disc member and at its outer end to one of the outer disc members 33 or 34. Each blade extends a distance radially beyond the circumferences of the disc members to which it is attached as shown at 37 in FIG. 4, and is bevelled to a sharp cutting outer edge 39a. The extension of the blades 36 beyond the peripheries of the discs is preferably about one inch beyond both the central disc member 31 and the outer disc members 33 and 34.

Since the central disc member 31 has a larger diameter than the outer disc members 33 and 34, each soil-working blade 36 is shaped in the form of a parallelogram with the outer and inner edges 39a and 39b extending parallel to each other and the end surfaces 39c and 39d extending parallel to each other, and the outer edges 39a of the series of blades 36 slant or converge, from their points of attachment to the central disc member 35 toward the axle 27 as they extend to meet one of the outer disc members 33 or 34. Furthermore, the planes of the blades are angled, rather than being coplanar with the axle 27. Each soil-working blade 36 is fixed to the central disc member 31 at a point circumferentially behind the point of attachment of such blade to one of the outer disc members 33 or 34 with respect to the normal direction of rotation of the rotary tool 20 (clockwise in FIG. 2). Because of this angling of the soil-working blades 36, they move soil toward the centerline of the row 15 as the tool 20 rotates in its normal direction of rotation.

Attached at right angles to the rearwardly extending arms of the U-shaped frame 22 are a pair of generally upwardly extending supports 38. A cross piece 40 joins the tops of the supports 38. A U-shaped packer support frame 42 extends rearwardly from the supports 38. A generally vertically disposed packer blade 44 is pivotally attached to the packer support frame 42 by means of a pivot pin 50 which extends through a lower blade eyelet 46 attached to the packer blade 44 and a pair of frame eyelets 47 and 48 attached to the packer support frame 42, as shown in FIG. 4. The eyelets 46, 47 and 48 can be small diameter pipe sections. An upper blade eyelet 52 is attached to the packer blade 44 above the lower blade eyelet 46, and pivotally carries one end of a guide rod 53 which extends from the upper blade eyelet 52 through an opening 41 in the cross piece 40. A piece of normally extended coil compression springs 55 and 56 surround the guide rod 53 on opposite sides of the cross piece 40, and are held in position by spring stops 58 and 59 which are attached to the guide rod 53.

It will thus be seen that the packer blade 44 pivots about a horizontal axis provided by the pivot pin 50 and that the pivotal motion of the packer blade 44 is limited in both rotational directions by the action of the springs 55 and 56. A lower portion of the packer blade 44 is shaped to curve rearwardly away from the direction of travel of the rotary tool 20.

In operation, the sub-soiler 16 and the planter 18 are attached to the tool bar 14 as shown in FIG. 1, in a manner well known to those skilled in the art and therefore not shown in detail. The seed bed preparation tool 20 is pivotally attached to the shank of the sub-soiler 16 at the point 25, utilizing spacer blocks 26 when necesary. The central disc member 31 of the tool 20 is thereby aligned directly behind the sub-soiler 16 and over the centerline of the row 15 defined by the sub-soiler furrow. As the tractor 11 pulls the combination implement, the sub-soiler 16 digs deeply into the soil to break up sub-soil compaction, forming a deep, narrow furrow along the row and turning up some moist dirt in the area of the centerline of the row 15 where the seed will be planted. The rotary tool 20 follows behind the sub-soiler 16 to work on the furrow created by the sub-soiler 16 and to prepare a seed bed for the planter 18. Because of the general converging shape of the rotary tool 20 defined by the sharp outer edges of the soil-working blades 36, the blades 36 dig into the soil more deeply at the center of the rotary tool 20 along the centerline of the row 15. As the rotary tool 20 turns, the blades 36 pulverize the soil and cut through any vegetation or root structure which may be present at the surface of the soil. Because of the angles of the blades 36, moist dirt turned up by the sub-soiler 16 in the immediate vicinity of the furrow is moved back toward the centerline of the row 15 to partially fill in the furrow left by the sub-soiler 16. In addition to the pulverizing and filling function of the soil-working blades 36, they form a small depression along the row because of the converging orientation in which they are mounted with respect to each other and the disc members 31, 33 and 34. The blades 36 also pack the soil somewhat in preparation for the planter.

Following the rotary portion of the tool 20, the packer blade 44 is drawn along the bottom of the depression created by the soil-working blades 36. The packer blade 44 is mounted in a position with respect to the axle 27 such that the lower outwardly curving portion of the packer blade 44 slides along the centerline of the row 15 and is biased into the soil by the spring 55. Although the width of the packer blade 44 can be varied, the packer blade 44 is preferably approximately four inches in width, so that a four inch strip of soil along the centerline of the row 15 is more firmly packed to a degree desirable for operation of the planter as described above. The packer blade 44 also assists in shaping a depression along the row for planting.

The operation of the seed bed preparation tool 20 is particularly efficient when it is drawn at speeds of four to five miles per hour, which is a common speed of operation of some planters of the type which can be used in combination with the seed bed preparation tool 20. However, the concept of the invention as disclosed herein is not limited to any particular speed.

It should be understood that the rotary portion of the seed bed preparation tool 20 is operable without the packer blade 44, but that seed bed preparation is improved still further when the packer blade 44 is utilized along with the rotary portion of the tool 20.

The elements of the combination implement, namely, the sub-soiler 16, the seed bed preparation tool 20 and the planter 18, cooperate to provide a planted field having seeds planted at a proper depth in moist soil formed in a desirable depression for later weed control, the results being a better potential for seed germination and a high yield. It should be understood that a single tractor 11 may pull several combination implements mounted to the tool bar 14 to form several rows in the field. It should be further understood that the seed bed preparation tool 20 is capable of operating independently of a combination implement to prepare a seed bed. For example, the rotary tool 20 could be pulled through the field following the operation of a typical plow. Operation is most efficient, however, when the seed bed preparation tool 20 is used in combination with the elements shown in FIG. 1, so that the elements cooperate to produce a better crop. Different types of planters known to those skilled in the art can be utilized following the operation of a seed bed preparation tool 20.

While this invention has been described in specific detail with particular reference to a preferred embodiment thereof, it will be understood that variations and modifications can be effected within the spirit and scope of the invention as described hereinbefore and as defined in the appended claims.

We claim:

1. In an agricultural implement including a sub-soiler for cutting a deep furrow in the earth to define a location for a crop row and a planter mounted behind and movable with said sub-soiler for planting seeds along the row defined by said sub-soiler, the improvement comprising a seed bed preparation means mounted between said sub-soiler and said planter, said seed bed preparation means comprising:

rotary, bladed means operating directly over the furrow formed by said sub-soiler for filling in the furrow formed by said sub-soiler with soil turned up by said sub-soiler and for forming a depression along the crop row, said rotary, bladed means rotating in a direction of rotation upon movement of said implement, and comprising:

a frame;

a horizontal axle rotatably mounted on said frame transverse to the crop row;

a central disc member mounted at its center to said axle;

a pair of outer disc members each mounted at its center to said axle in spaced relation to said central disc member on opposite sides thereof along said axle, said outer disc members having diameters less than the diameter of said central disc member; and a plurality of soil-working blades, said blades converging toward said axle as they extend from said central disc member to one of said disc members, and each of said soil-working blades being attached to said outer disc member at a point relative to the direction of rotation of said disc members ahead of the point at which said soil-working blade is attached to said central disc member so as to be angled to move soil toward said central disc member as said soil-working blade rotates with said axle; and a means for packing the soil in a central portion of the depression prior to said planter.

2. The implement of claim 1 wherein said packing means comprises a packing blade pivotally mounted to said frame about a horizontal pivot axis, and a means for biasing said packing blade about said pivot axis to urge a lower portion of said packing blade toward the ground in a central portion of said depression formed by said rotary, bladed means, said lower portion of said packing blade curving rearwardly away from said frame.

* * * * *